(12) United States Patent
Mifune (10) Patent No.: US 11,467,626 B2
(45) Date of Patent: Oct. 11, 2022

(54) DISPLAY DEVICE (71) Applicant: Japan Display Inc., Tokyo (JP)

(72) Inventor: Masayuki Mifune, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/189,951

(22) Filed: Mar. 2, 2021

(65) Prior Publication Data

US 2021/0181792 A1 Jun. 17, 2021

Related U.S. Application Data

(63) Continuation of application No. PCT/JP2019/030748, filed on Aug. 5, 2019.

(30) Foreign Application Priority Data

Sep. 4, 2018 (JP) .............................. JP2018-165085

(51) Int. Cl.
*G06F 1/16* (2006.01)
*G02B 27/01* (2006.01)
(52) U.S. Cl.
CPC ........... *G06F 1/1603* (2013.01); *G02B 27/01* (2013.01); *G02B 2027/0118* (2013.01)
(58) Field of Classification Search
CPC .......................... G02F 1/133605; G06F 1/1603
See application file for complete search history.

(56) References Cited

U.S. PATENT DOCUMENTS

| 4,915,479 | A |  | 4/1990 | Clarke |
|---|---|---|---|---|
| 5,673,995 | A | * | 10/1997 | Segaud .................. H05K 1/189 |
| | | | | 362/489 |
| 2013/0194674 | A1 | | 8/2013 | Horiuchi et al. |
| 2014/0267973 | A1 | | 9/2014 | Shinojima |
| 2018/0118103 | A1 | | 5/2018 | Sato |
| 2018/0136519 | A1 | | 5/2018 | Yata et al. |
| 2019/0369392 | A1 | * | 12/2019 | Matsuura ............. G02B 3/0068 |
| 2021/0181579 | A1 | * | 6/2021 | Mifune ............. G02F 1/133606 |
| 2022/0043487 | A1 | * | 2/2022 | Sheiner ................. G03B 15/06 |
| 2022/0075407 | A1 | * | 3/2022 | Chen ....................... G06F 1/181 |
| 2022/0083096 | A1 | * | 3/2022 | Oh ........................ G06F 1/1603 |

FOREIGN PATENT DOCUMENTS

| JP | S63-163305 A | 7/1988 |
|---|---|---|
| JP | 2005-292561 A | 10/2005 |
| JP | 2006-276728 A | 10/2006 |
| JP | 2008-290314 A | 12/2008 |

(Continued)

OTHER PUBLICATIONS

International Search Report dated Sep. 10, 2019 in PCT/JP2019/030748.

(Continued)

*Primary Examiner* — Anthony Q Edwards
(74) *Attorney, Agent, or Firm* — K&L Gates LLP (57) ABSTRACT

A display device includes a light source configured to emit light, a display panel capable of receiving the light from a first surface side and transmitting the light to a second surface side, and a cylindrical hood extending to the first surface side of the display panel from the light source and covering a periphery of an optical axis of the light. The hood is made of black resin.

6 Claims, 10 Drawing Sheets

(56) References Cited

FOREIGN PATENT DOCUMENTS

| | | |
|---|---|---|
| JP | 2014-178368 A | 9/2014 |
| JP | 2015-206809 A | 11/2015 |
| JP | 2018-070066 A | 5/2018 |
| JP | 2018-081145 A | 5/2018 |
| WO | 2014/136598 A1 | 9/2014 |

OTHER PUBLICATIONS

Chinese Office Action dated May 24, 2022 in corresponding Chinese Application No. 201980056893.2.

* cited by examiner

DISPLAY DEVICE

CROSS-REFERENCE TO RELATED APPLICATIONS

This application is based upon and claims the benefit of priority from International Patent Application No. PCT/JP2019/030748, filed on Aug. 5, 2019, which claims priority from Japanese Application No. 2018-165085, filed on Sep. 4, 2018, the entire contents of which are incorporated herein by reference.

BACKGROUND

1. Technical Field

The present disclosure relates to a display device.

2. Description of the Related Art

As described in Japanese Patent Application Laid-open Publication No. 2014-178368, what-is-called head up displays (HUD) that project an image onto a member having translucency, such as glass, have been known.

The HUD projects an image by causing a display panel to transmit light from a light source. In the conventional HUD, what-is-called light leakage may however occur in which light from the light source diffuses so as to unnecessarily leak in directions other than the direction toward the display panel. Occurrence of the light leakage causes portions requiring no light to be unintentionally viewed as if the portions are illuminated, lowering display quality.

In particular, when what-is-called local dimming of individually controlling a plurality of light sources to illuminate a display panel and turning off the light sources corresponding to portions requiring no light is performed, undesirable illumination of the portions requiring no light due to the light leakage causes reduction in display quality, such as black floating.

For the foregoing reasons, there is a need for a display device capable of inhibiting reduction in display quality that would occur due to light leakage.

SUMMARY

According to an aspect, a display device includes a light source configured to emit light, a display panel capable of receiving the light from a first surface side and transmitting the light to a second surface side, and a cylindrical hood extending to the first surface side of the display panel from the light source and covering a periphery of an optical axis of the light. The hood is made of black resin.

DETAILED DESCRIPTION

Hereinafter, embodiments of the present disclosure will be described with reference to the drawings. The disclosure is merely an example, and appropriate modifications within the gist of the disclosure at which those skilled in the art can easily arrive are encompassed in the range of the present disclosure. To further clarify the description, widths, thicknesses, shapes, and the like of various parts may be schematically illustrated in the drawings as compared with actual aspects thereof. They are however merely examples and do not limit interpretation of the present disclosure. In the present specification and the drawings, the same reference numerals denote components similar to those described before with reference to the drawing that has been already referred, and detail explanation thereof can be appropriately omitted.

In this disclosure, when an element is described as being "on" another element, the element can be directly on the other element, or there can be one or more elements between the element and the other element.

Figure 1:
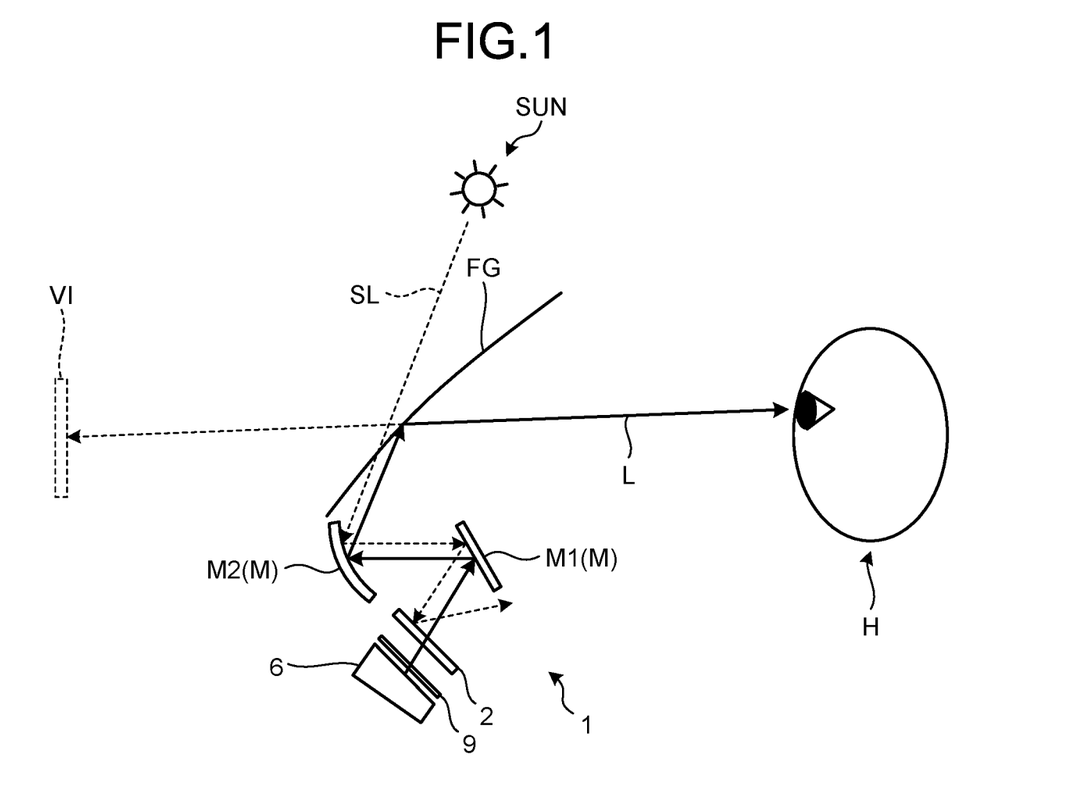
FIG. 1 is a schematic diagram illustrating the main configuration of a display device according to an embodiment.

FIG. 1 is a schematic diagram illustrating the main configuration of a display device 1. The display device 1 includes a light source unit 6 functioning as a light source device, a display unit 2 configured to output an image using light L from the light source unit 6 as a light source, and a diffusion plate 9 provided between the display unit 2 and the light source unit 6, for example. The light L emitted from the light source unit 6 is diffused by the diffusion plate 9 and reaches the display unit 2, so that a part or all of the light L passes through the display unit 2, is reflected by mirrors M and a window shield FG, and reaches a user H to be recognized as an image VI in a visual field of the user H. That is to say, the display device 1 in the embodiment functions as a head-up display (HUD) using the mirrors M and the window shield FG. Although the window shield FG is, for example, a window shield of a vehicle, it is sufficient that the window shield FG is a member having translucency and located on the visual line of the user H.

In the embodiment, plate surfaces of the display unit 2 and the diffusion plate 9 are inclined with respect to an optical axis IL (see FIG. 9 and other figures) of the light L traveling toward a plate mirror M1 from the light source unit 6. An optical axis of external light SL entering the display unit 2 through the mirrors M can be directed to a direction differing from the optical axis IL of the light L due to the inclination of the display unit 2 with respect to the optical axis IL. Generation of a ghost due to the external light SL reaching to the user H through the mirrors M again after being reflected by the display unit 2 can be therefore be hindered.

Although in FIG. 1, the light L after passing through the display unit 2 is guided by two mirrors M including the plate mirror M1 and a concave mirror M2, the number of mirrors may be one or equal to or more than three.

Figure 2:
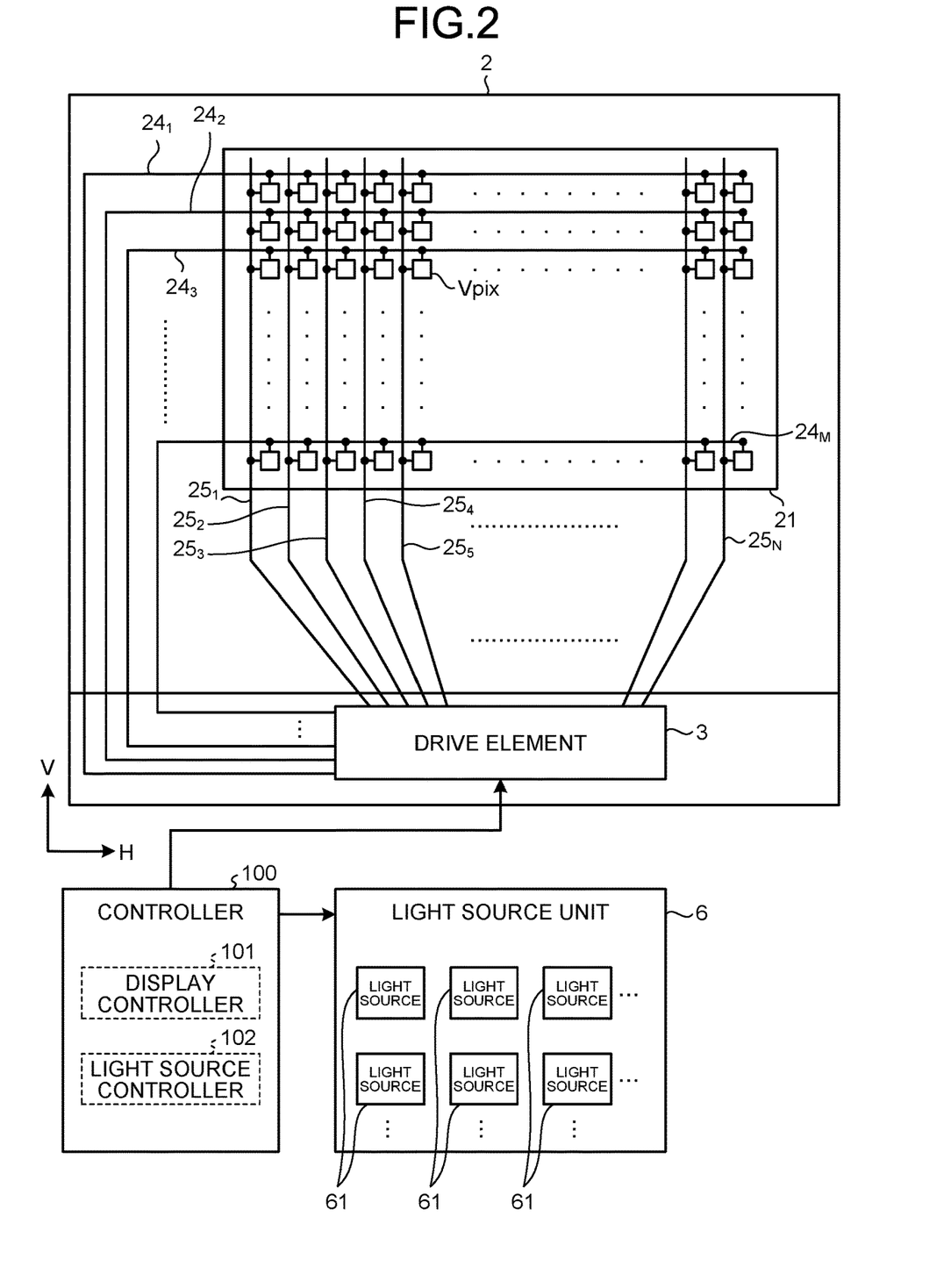
FIG. 2 is a block diagram illustrating an example of the system configuration of a display unit.
Figure 3:
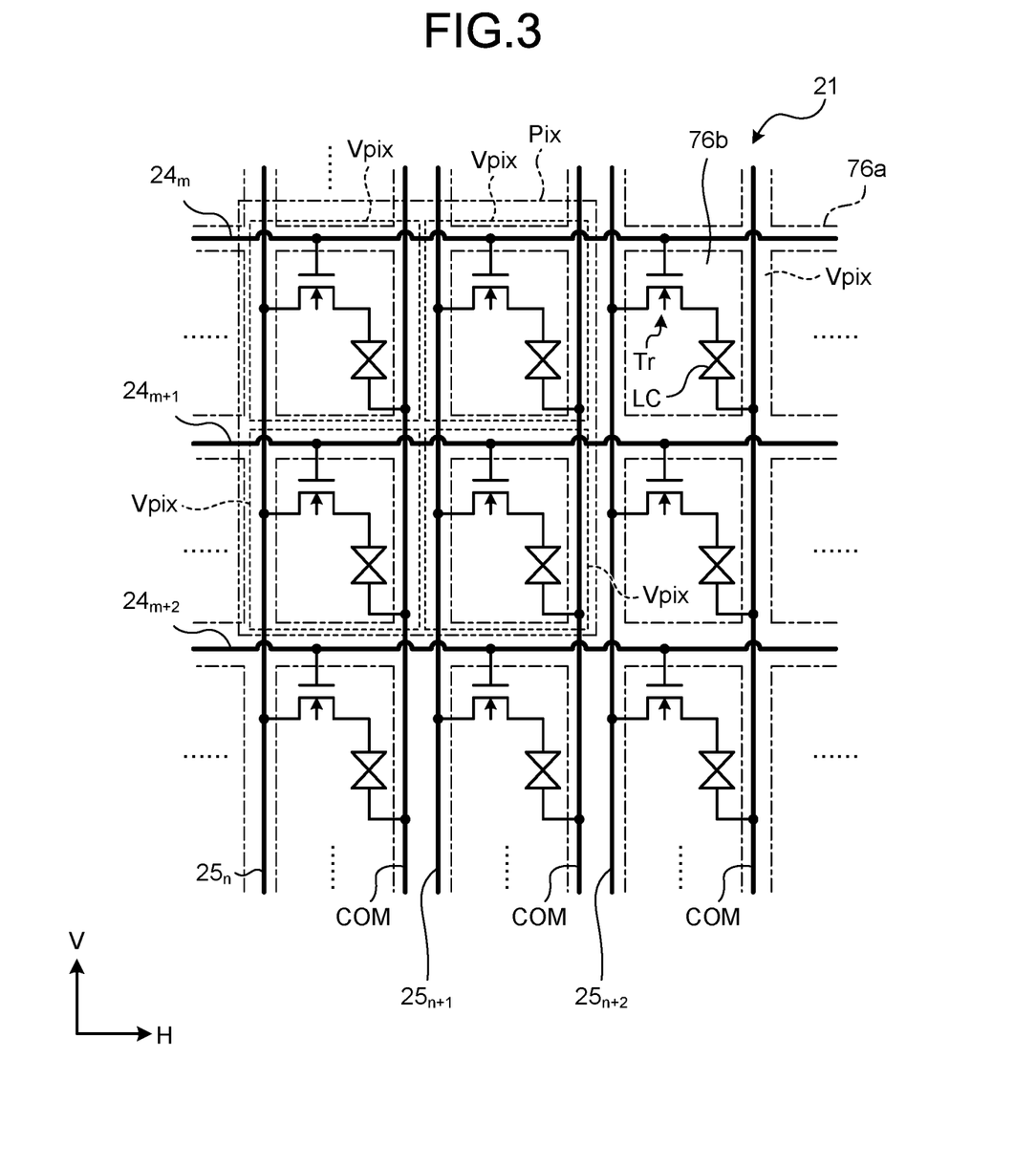
FIG. 3 is a circuit diagram illustrating an example of the configuration of a drive circuit configured to drive pixels in the display unit.

Next, the display unit 2 is described. FIG. 2 is a block diagram illustrating an example of the system configuration of the display unit 2. FIG. 3 is a circuit diagram illustrating an example of the configuration of a drive circuit configured to drive pixels Pix in the display unit 2. The display unit 2 in the embodiment is a transmissive liquid crystal display that outputs an image using the light L as the light source. The display unit 2 is, for example, a transmissive liquid crystal display and includes an image output panel and a drive element 3, for example, a display driver integrated circuit (DDIC).

The image output panel includes, for example, a translucent insulating substrate, such as a glass substrate, and has a display region 21 provided on the surface of the glass substrate and formed by arranging a large number of pixels Pix including liquid crystal cells in a matrix (row-column configuration). Each pixel Pix includes a plurality of sub pixels Vpix (see FIG. 3). The glass substrate includes a first substrate on which a large number of pixel circuits including active elements (for example, transistors) are arranged and formed in a matrix with a row-column configuration and a second substrate arranged so as to oppose the first substrate with a predetermined space therebetween. The space between the first substrate and the second substrate is kept to a predetermined space by photo spacers arranged and formed at places on the first substrate. Liquid crystal is sealed between the first substrate and the second substrate. Arrangement and sizes of the components illustrated in FIG. 2 are schematic and do not reflect actual arrangement and the like.

The display region 21 has a matrix (row-column) configuration in which M rows×N columns of the sub pixels Vpix including liquid crystal layers are arranged. In this specification, a row indicates a pixel row having N sub pixels Vpix aligned in one direction. A column indicates a pixel column having M sub pixels Vpix aligned in a direction orthogonal to the row extension direction. Values of M and N are determined in accordance with a resolution in the vertical direction and a resolution in the horizontal direction. In the display region 21, scan lines $24_1$, $24_2$, $24_3$, . . . , and $24_M$ are arranged for the respective rows along an H direction and signal lines $25_1$, $25_2$, $25_3$, . . . , and $25_N$ are arranged for the respective columns along a V direction in an array of M rows and N columns of the sub pixels Vpix. Hereinafter, in the embodiment, the scan lines $24_1$, $24_2$, $24_3$, . . . , and $24_M$ may be representatively expressed as scan lines 24, and the signal lines $25_1$, $25_2$, $25_3$, . . . , and $25_N$ may be representatively expressed as signal lines 25. In the embodiment, any three scan lines of the scan lines $24_1$, $24_2$, $24_3$, . . . , and $24_M$ are expressed as scan lines $24_m$, $24_{m+1}$, and $24_{m+2}$ (m is a natural number satisfying m≤M-2), and any three signal lines of the signal lines $25_1$, $25_2$, $25_3$, . . . , and $25_N$ are expressed as signal lines $25_n$, $25_{1+1}$, and $25_{n+2}$ (n is a natural number satisfying n≤N-2).

The drive element 3 is a circuit mounted on the glass substrate of the image output panel by chip on glass (COG), for example. The drive element 3 is coupled to a controller 100 through a flexible printed circuit (FPC) (not illustrated). The controller 100 is a circuit configured to control operations of the display unit 2 and the light source unit 6. To be specific, the controller 100 functions as, for example, a display controller 101 and a light source controller 102. The display controller 101 outputs pixel signals for individually driving the sub pixels Vpix constituting the pixels Pix. The pixel signal is a signal provided by combining individual gradation values of, for example, red (R), green (G), blue (B), and white (W), which will be described later, and the color types and the number of colors corresponding to the gradation values constituting the pixel signal are optionally determined. The display controller 101 has a function of controlling output gradation values of some or all of the pixels based on the light emission amounts of light sources 61 that are controlled by the light source controller 102. The light source controller 102 controls operations of the light sources 61 based on a display output image of the display unit 2. To be specific, the light source controller 102 individually controls the operations of the light sources 61 constituting the light source unit 6. The controller 100 may have a function of outputting various types of signals (for example, a master clock, a horizontal synchronization signal, and a vertical synchronization signal) that are used for operations of the display unit 2. Configurations for outputting the various types of signals may be separately provided.

In the embodiment, the light source controller 102 employs what-is-called one-frame delay control of controlling the operations of the light sources 61 based on the pixel signals output from the display controller 101 for one preceding frame. The one-frame delay control can omit a buffer for holding the pixel signals, the buffer being necessary when the operations of the light sources 61 are tried to be controlled in the same frame as the pixel signals. The operations of the light sources 61 may be controlled in the same frame as the pixel signals by providing the buffer.

The display unit 2 is coupled to an external input power supply (not illustrated) and the like. Electric power necessary for the operations of the display unit 2 is supplied from the external input power supply.

To be more specific, the drive element 3 operates the display unit 2 in accordance with various signals received from the controller 100, for example. The controller 100 outputs, to the drive element 3, for example, the master clock, the horizontal synchronization signal, the vertical synchronization signal, the pixel signals, and a drive instruction signal for the light source unit 6. The drive element 3 functions as a gate driver and a source driver based on these signals and the like. At least one of the gate driver and the source driver or both of them may be formed on a substrate using thin film transistors (TFT), which will be described later. In this case, it is sufficient that at least one of the gate driver and the source driver or both of them is(are) electrically coupled to the drive element 3. The source driver and the gate driver may be electrically coupled to different drive elements 3 or the same drive element 3.

The gate driver latches digital data by a unit of one horizontal period in accordance with the horizontal synchronization signal in synchronization with the vertical synchronization signal and the horizontal synchronization signal. The gate driver sequentially outputs the latched digital data for one line as a vertical scan pulse and supplies it to each of the scan lines 24 (scan line $24_1$, $24_2$, $24_3$, . . . , and $24_M$) in the display region 21, thereby sequentially selecting the sub pixels Vpix row by row. The gate driver sequentially outputs the digital data to each of the scan lines $24_1$, $24_2$, $24_3$, . . . , and $24_M$ in the row direction from one end side to the other end side of the display region 21, for example. The gate driver can also sequentially output the digital data to each of the scan lines $24_M$, . . . in the row direction from the other end side to one end side of the display region 21.

The source driver receives data for pixel driving that is generated based on the pixel signals, for example. The source driver writes, through the signal lines 25 (signal lines $25_1$, $25_2$, $25_3$, ..., and $25_N$), the data for pixel driving to the sub pixels Vpix in a row selected by vertical scanning by the gate driver in units of a sub pixel, in units of a plurality of sub pixels, or in one unit of all the sub pixels.

Known examples of the driving method of the liquid crystal display panel include driving methods of line inversion, dot inversion, and frame inversion. The line inversion is a driving method of inverting the polarities of video signals at a time cycle of 1H (H is a horizontal period) corresponding to one line (one pixel row). The dot inversion is a driving method of alternately inverting the polarities of video signals for sub pixels adjacent to each other in two intersecting directions (for example, row and column directions). The frame inversion is a driving method of inverting, at a time, video signals to be written to all the sub pixels Vpix for each frame corresponding to one screen with the same polarity. The display unit 2 may employ any one of the driving methods described above.

In explanation of the embodiment, the M scan lines $24_1$, $24_2$, $24_3$, ..., and $24_M$ may be referred to as the scan lines 24 when they are collectively handled. The scan lines $24_m$, $24_{m+1}$, and $24_{m+2}$ in FIG. 3 are a part of the M scan lines $24_1$, $24_2$, $24_3$, ..., and $24_M$. The N signal lines $25_1$, $25_2$, $25_3$, ..., and $25_N$ may be referred to as the signal lines 25 when they are collectively handled. The signal lines $25_n$, $25_{n+1}$, and $25_{n+2}$ in FIG. 3 are a part of the N signal lines $25_1$, $25_2$, $25_3$, ..., and $25_N$.

Wiring such as the signal lines 25 supplying the pixel signals to TFT elements Tr of the sub pixels Vpix and the scan lines 24 driving the respective TFT elements Tr is formed in the display region 21. As described above, the signal lines 25 extend in a plane parallel to the surface of the above-mentioned glass substrate and supply, to the sub pixels Vpix, the data for pixel driving generated based on the pixel signals for outputting images. The sub pixels Vpix include the TFT elements Tr and liquid crystal elements LC. The TFT elements Tr are formed by thin film transistors and, in this example, are formed by n-channel metal oxide semiconductor (MOS)-type TFTs. One of a source and a drain of each TFT element Tr is coupled to the signal line 25, a gate thereof is coupled to the scan line 24, and the other of the source and the drain thereof is coupled to one end of the liquid crystal element LC. One end of each liquid crystal element LC is coupled to the other of the source and the drain of the TFT element Tr, and the other end thereof is coupled to a common electrode COM. A drive electrode driver (not illustrated) applies a drive signal to the common electrodes COM. The drive electrode driver may be one structure of the drive element 3 or an independent circuit.

Each scan line 24 couples the sub pixel Vpix to the other sub pixels Vpix belonging to the same row in the display region 21. The scan lines 24 are coupled to the gate driver and receive supply of vertical scan pulses of scan signals from the gate driver. Each signal line 25 couples the sub pixel Vpix to the other sub pixels Vpix belonging to the same column in the display region 21. The signal lines 25 are coupled to the source driver and receive supply of the pixel signals from the source driver. Each common electrode COM couples the sub pixel Vpix to the other sub pixels Vpix belonging to the same column in the display region 21. The common electrodes COM are coupled to a drive electrode driver (not illustrated) and receive supply of the drive signal from the drive electrode driver.

The gate driver applies the vertical scan pulse to the gates of the TFT elements Tr of the sub pixels Vpix through one of the scan lines 24, thereby sequentially selecting, as an image output target, one row (one horizontal line) of the sub pixels Vpix formed in a matrix with the row-column configuration in the display region 21. The source driver supplies, through the signal lines 25, the pixel signals to the sub pixels Vpix included in one horizontal line that the gate driver sequentially selects. Image output of one horizontal line is performed in these sub pixels SPix in accordance with the supplied pixel signals.

As described above, in the display unit 2, the gate driver drives to sequentially scan the scan line 24, thereby sequentially selecting one horizontal line. The source driver supplies the pixel signals to the sub pixels Vpix belonging to one horizontal line through the signal lines 25, whereby image output is performed in the display unit 2 on a horizontal line basis. In this image output operation, the drive electrode driver applies the drive signal to the common electrodes COM corresponding to the one horizontal line.

The display region 21 has a color filter. The color filter includes a lattice-shaped black matrix 76a and openings 76b. The black matrix 76a is formed to cover the outer circumferences of the sub pixels Vpix as illustrated in FIG. 3. In other words, the black matrix 76a is arranged at boundaries between the two-dimensionally arranged sub pixels Vpix, thereby having the lattice shape. The black matrix 76a is made of a material having high light absorptivity. The openings 76b are openings formed by the lattice shape of the black matrix 76a and arranged at positions corresponding to the sub pixels Vpix.

The openings 76b have color regions corresponding to the sub pixels Vpix of three colors (for example, red (R), green (G), and blue (B)) or four colors. Specifically, the openings 76b have color regions colored with three colors of red (R), green (G), and blue (B) as an example of a first color, a second color, and a third color and a color region of a fourth color (for example, white (W)). In the color filter, the color regions colored with the three colors of red (R), green (G), and blue (B) are periodically arrayed in the openings 76b, for example. When the fourth color is white (W), the openings 76b of white (W) are not colored by the color filter. When the fourth color is another color, the openings 76b are colored by the color filter with the color employed as the fourth color. In the embodiment, the color regions of four colors as one set: the three colors of R, G, and B and the fourth color (for example, white (W)), are made to correspond to the sub pixels Vpix illustrated in FIG. 3 to form one pixel Pix. The pixel signal supplied to one pixel Pix in the embodiment corresponds to output of one pixel Pix including the sub pixels Vpix of red (R), green (G), blue (B), and the fourth color (white (W)). In explanation of the embodiment, red (R), green (G), blue (B), and white (W) may be simply referred to as R, G, B, and W, respectively. When the pixel Pix includes the sub pixels Vpix of equal to or less than two or equal to or more than five colors, it is sufficient that digital data corresponding to the number of colors is supplied based on original image data.

The color filter may be colored with a combination of other colors as long as it is colored with different colors. In general, in the color filter, the luminance in the color region of green (G) is higher than those of the color region of red (R) and the color region of blue (B). When the fourth color is white (W), light-transmissive resin may be used for the color filter to produce white.

When the display region 21 is viewed from the direction orthogonal to the front, the scan lines 24 and the signal lines 25 are arranged in regions overlapping with the black matrix 76a of the color filter. In other words, the scan lines 24 and the signal lines 25 are hidden behind the black matrix 76a when viewed from the direction orthogonal to the front. In the display region 21, regions in which the black matrix 76a is not arranged correspond to the openings 76b.

Figure 4:
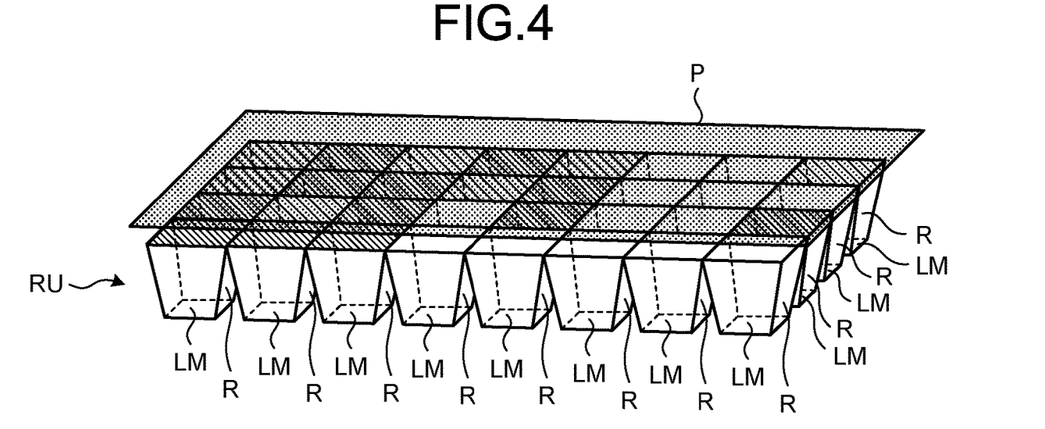
FIG. 4 is a schematic view of the display device capable of local dimming.

FIG. 4 is a schematic view of the display device capable of local dimming. A display device enabling the local dimming includes a display panel P capable of changing light transmittance in accordance with a display image, a plurality of light sources LM, and a plurality of reflectors R. The light sources LM are arranged on the opposite side (rear surface side) to a display surface of the display panel P when viewed from the display surface side. The light sources LM are arrayed in a two-dimensional matrix form with a row-column configuration. The light sources LM individually emit light to the display panel P. The reflectors R are provided for the respective light sources LM. Each reflector R is a cylindrical member that broadens toward the display panel P side from the light source LM side. The light source LM is arranged on a first end side of the cylinder of the reflector R, and the display panel P is arranged on a second end side thereof. The reflector R reflects the light of the light source LM by the inner surface thereof and guides the light toward the display panel P side.

The reflectors R are provided in a two-dimensional matrix form with a row-column configuration on the rear surface side of the display panel P in a manner similar to the light sources LM. The reflectors R are integrally formed to constitute a reflector unit RU.

Figure 5:
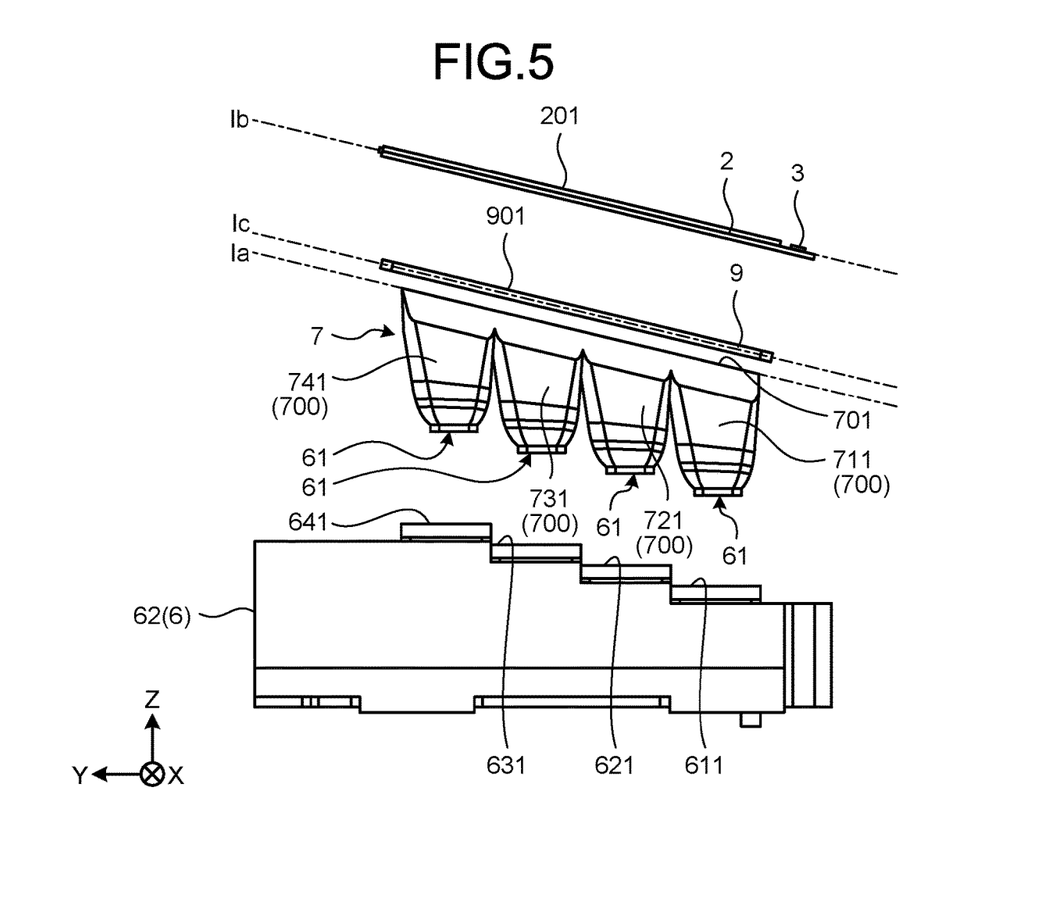
FIG. 5 is a diagram illustrating aspects and an arrangement of the display unit, a light source unit, a light guiding unit, and a diffusion plate.

FIG. 5 is a diagram illustrating aspects and an arrangement of the display unit 2, the light source unit 6, a light guiding unit 7, and the diffusion plate 9. In the following explanation, the direction of the light L emitted to the display unit 2 along the optical axis IL is a Z direction. One of two directions along a plane orthogonal to the Z direction is an X direction, and the other thereof is a Y direction. The X direction is a direction identical to the H direction. The Y direction overlaps with the V direction in a plan view when viewed from the Z direction. In the embodiment, the optical axis IL is set by arrangement of a substrate 612 (see FIG. 14) included in the light source 61. To be specific, each light source 61 is designed to output the light L from a light emitting element (for example, a light emitting diode (LED) 611) provided on the plate surface of the substrate 612 such that the direction orthogonal to the substrate 612 is the optical axis IL. That is to say, the optical axis IL is set to be the Z direction by arranging the substrate 612 along the X-Y plane.

The display device 1 in the embodiment includes the light guiding unit 7 functioning as the reflector unit RU. The light guiding unit 7 has a plurality of hoods 700. The hoods 700 function as the reflectors R. That is to say, the hoods 700 are provided as cylindrical members extending toward the display unit 2 from the light sources 61 and covering the peripheries of the optical axes IL of the light L from the light sources 61. The hoods 700 reflect the light L from the light sources 61 by the inner surfaces thereof and guide it to the display unit. FIG. 5 illustrates four hoods 700 aligned along an output surface 701 formed by the edges of output ports from which the light from the light sources 61 is emitted. In FIG. 5 and other figures, different reference numerals are assigned to the hoods 700 column by column like hoods 711, 721, 731, and 741 in order to distinguish the four hoods 700 provided at different positions from one another. The output surface 701 is along a first direction Ia. The first direction Ia is inclined with respect to the Y direction. The light source 61 is arranged at a first end of the hood 700. The first end of each hood 700 is an end portion on the opposite side to the output surface 701. Hereinafter, a second end of the hood 700 indicates an end portion on the output surface 701 side. The first ends of the hoods 700 at which the light sources 61 are arranged are along the X-Y plane. The light sources 61 function as the light sources LM. The display unit 2 functions as the display panel P.

At a first end of the light guiding unit 7, the first ends of the hoods 700 aligned along the first direction Ia form step-wise level differences. In FIG. 5, the positions of the first ends of the hoods 700 aligned along the first direction Ia are displaced to the output direction (upward) of the light from the light sources 61, that is, to the second ends in a stepwise manner in the order of the hoods 711, 721, 731, and 741. In other words, the first end of the hood 721 and the light source 61 provided to the hood 721 are located closer to the second end than the first end of the hood 711 and the light source 61 provided to the hood 711 are. The first end of the hood 731 and the light source 61 provided to the hood 731 are located closer to the second end than the first end of the hood 721 and the light source 61 provided to the hood 721 are. The first end of the hood 741 and the light source 61 provided to the hood 741 are located closer to the second end than the first end of the hood 731 and the light source 61 provided to the hood 731 are.

A power supply unit 62 is provided on the first end side of the light guiding unit 7. Step-wise level differences corresponding to the light sources LM arranged so as to form the step-wise level differences as described above are formed on the light guiding unit 7 side of the power supply unit 62. The light sources 61 provided on the first end sides of the respective hoods 700 are coupled to the surface on the light guiding unit 7 side of the power supply unit 62 to receive supply of electric power from the power supply unit 62 and control of the light amounts from the controller 100. Although FIG. 5 illustrates a space between the power supply unit 62 and the light guiding unit 7, the space is not actually provided. That is to say, the light sources 61 provided on the first end sides of the respective hoods 700 are arranged on any of the levels on the light guiding unit 7 side of the power supply unit 62. The surfaces of a first level 611, a second level 621, a third level 631, and a fourth level 641 on the light guiding unit 7 side, which are the surfaces of the respective levels on the light guiding unit 7 side, are along the X-Y plane. The light source 61 provided to the hood 711 is placed on the first level 611. The light source 61 provided to the hood 721 is placed on the second level 621. The light source 61 provided to the hood 731 is placed on the third level 631. The light source 61 provided to the hood 741 is placed on the fourth level 641.

The display unit 2 and the diffusion plate 9 are arranged on the output surface 701 side of the light guiding unit 7. The diffusion plate 9 is interposed between the display unit 2 and the light guiding unit 7. A plate surface 201 of the display unit 2 is along a second direction Ib. A plate surface 901 of the diffusion plate 9 is along a third direction Ic. The second direction Ib and the third direction Ic are inclined with respect to the Y direction. In the embodiment, the inclination directions and inclination angles of the first direction Ia, the second direction Ib, and the third direction Ic with respect to the Y direction are identical. At least one of the first direction Ia, the second direction Ib, and the third direction Ic may be different from another direction. In this case, difference between the inclination angle of the second direction Ib with respect to the Y direction and the inclination angle of the third direction Ic with respect to the Y direction is desirably within a range of ±2%. When one thereof (the inclination angle of the second direction Ib with respect to the Y direction or the inclination angle of the third direction Ic with respect to the Y direction) is 100%, the "2%" is a ratio of the other one.

Figure 6:
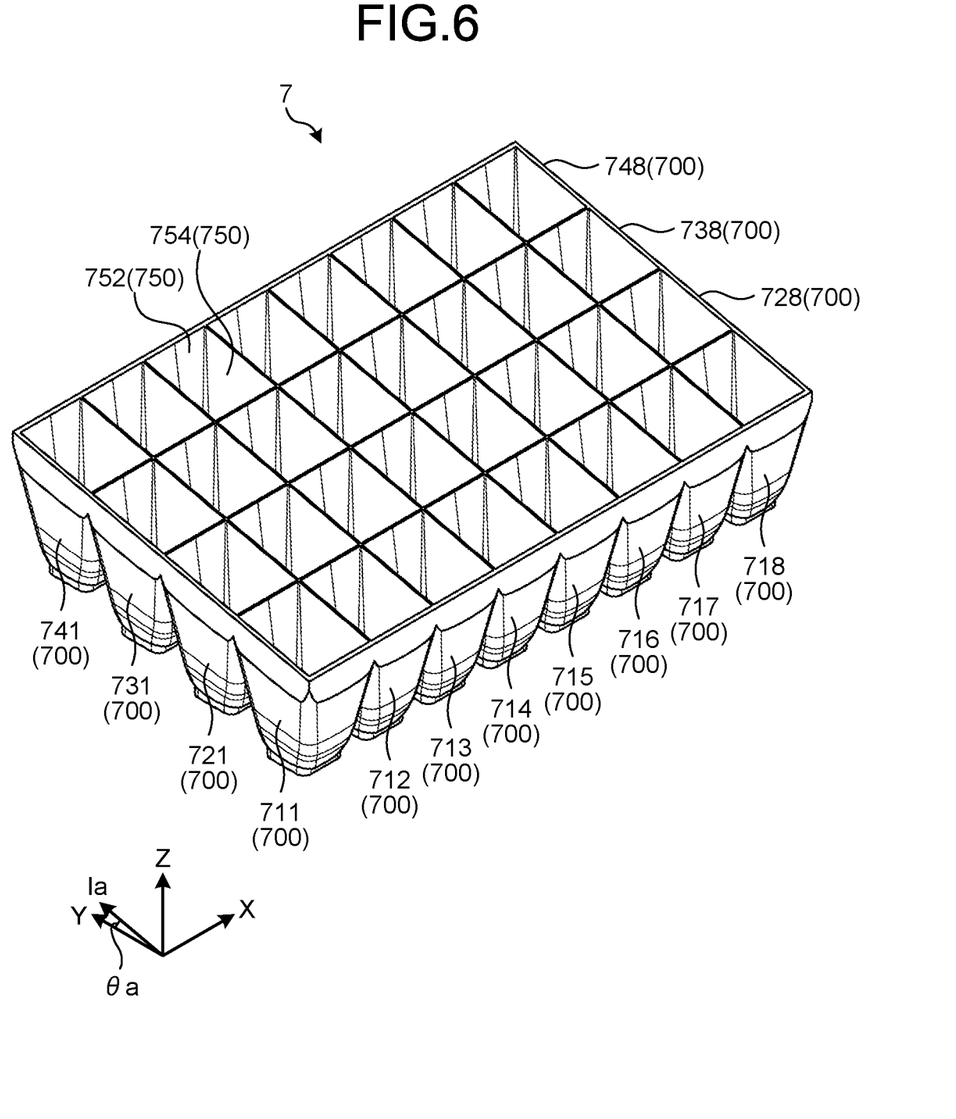
FIG. 6 is a perspective view illustrating the light guiding unit.
Figure 7:
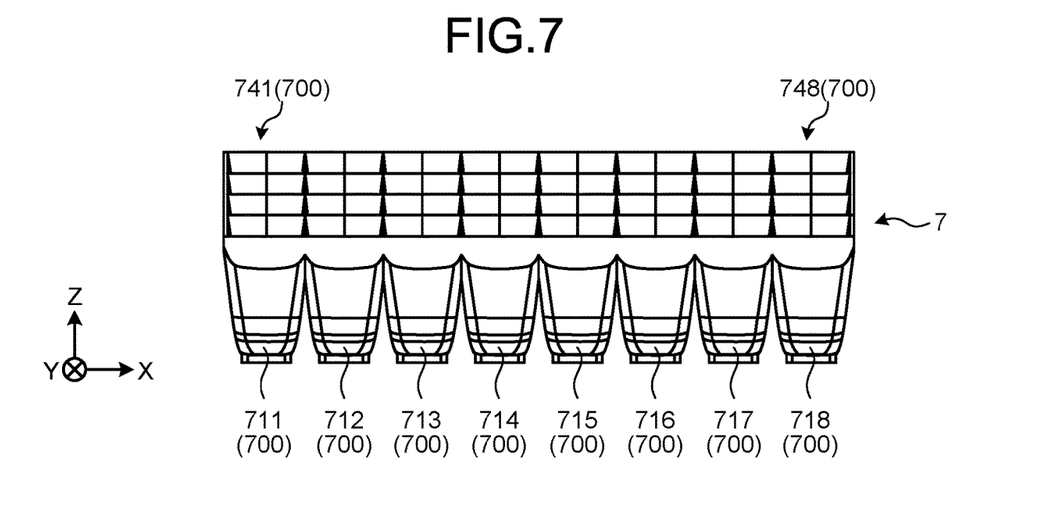
FIG. 7 is an X-Z plan view of the light guiding unit.

FIG. 6 is a perspective view of the light guiding unit 7. FIG. 7 is an X-Z plan view of the light guiding unit 7. The light guiding unit 7 has the hoods 700 aligned along the X direction. FIG. 6 and FIG. 7 illustrate a row of the hoods 700 that is formed by eight hoods 700 aligned in the X direction, like hood 711, 712, 713, 714, 715, 716, 717, and 718. Also at positions of hoods 721, 731, and 741 in columns differing from that of the hood 711, eight hoods 700 aligned in the X direction form the rows of the hoods 700, like hood 721, . . . , and 728, hoods 731, . . . , and 738, and hoods 741, . . . , and 748. The number of hoods 700 aligned along the X direction may be equal to or less than seven or equal to or more than nine. Similarly, the number of hoods 700 aligned along the first direction Ia may be equal to or less than three or equal to or more than five. The number and arrangement of the light sources 61 correspond to the number and arrangement of the hoods 700.

The output surface 701 described with reference to FIG. 5 is the surface along the edges of the second ends of the hoods 700 arrayed in the row and column directions (see FIG. 6 and FIG. 7). As described above, the output surface 701 is along the first direction Ia and is inclined with respect to the Y direction. In FIG. 6, the inclination angle of the first direction Ia with respect to the Y direction is an angle θa. The angle θa is, for example, 13°. The angle is however merely an example, is not limited thereto, and can be appropriately changed.

Figure 8:
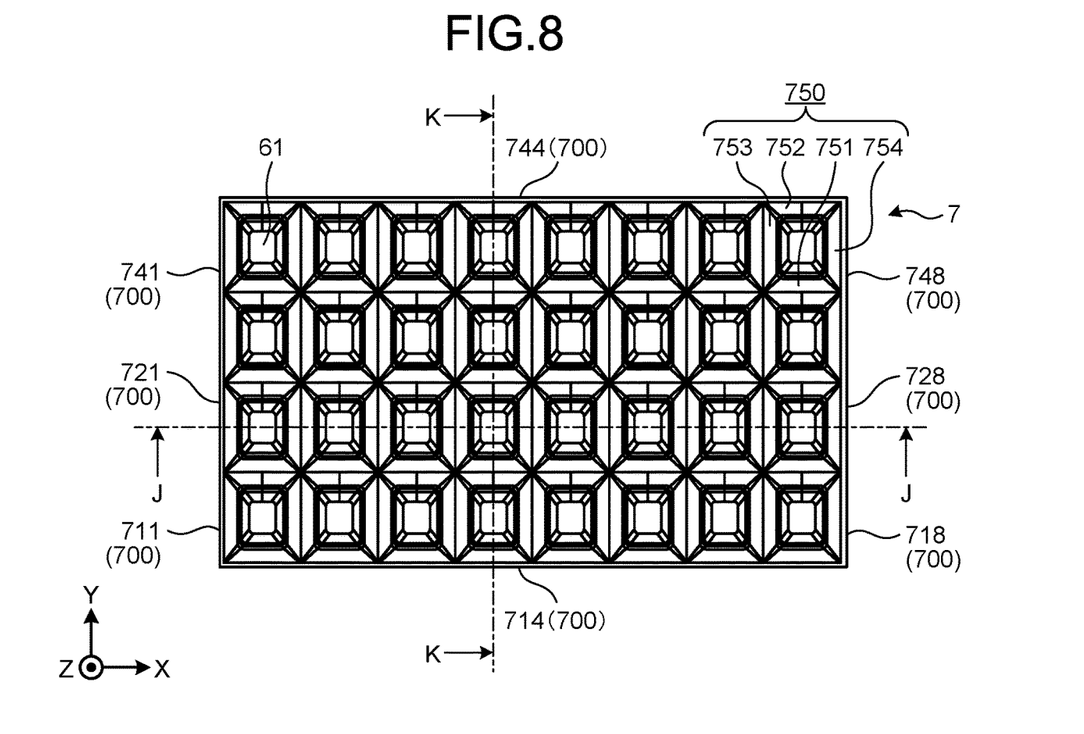
FIG. 8 is an X-Y plan view of the light guiding unit.
Figure 9:
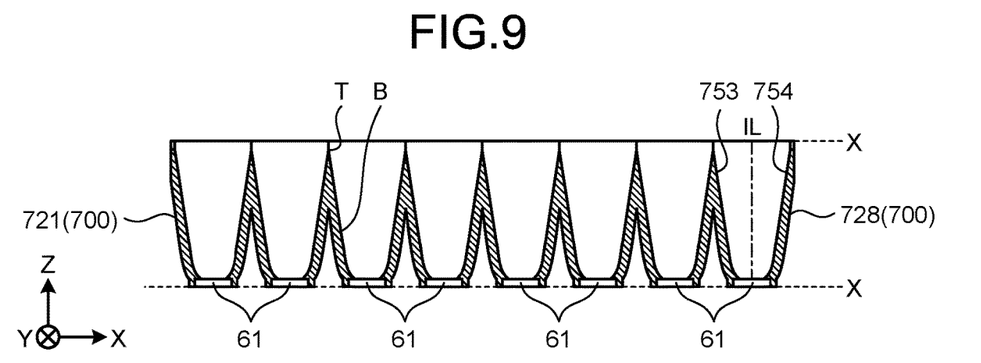
FIG. 9 is a cross-sectional view cut along line J-J in FIG. 8.
Figure 10:
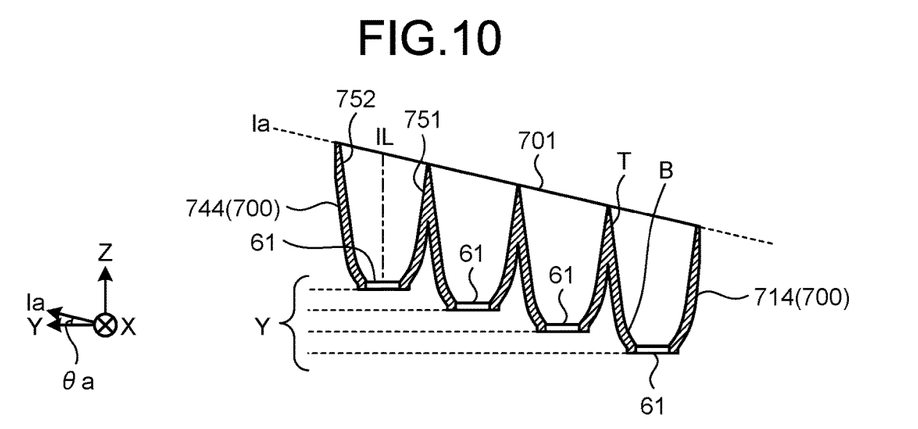
FIG. 10 is a cross-sectional view cut along line K-K in FIG. 8.

FIG. 8 is an X-Y plan view of the light guiding unit 7. FIG. 9 is a cross-sectional view cut along line J-J in FIG. 8. The cross section cut along line J-J is a cross section of the row of the hoods 700 that is formed by the hoods 721, . . . , and 728 when cut along the X-Z plane, and the same applies to cross sections of the other rows of the hoods 700 when cut along the X-Z plane. FIG. 10 is a cross-sectional view cut along line K-K in FIG. 8. The cross section cut along line K-K is a cross section of the column of the hoods 700 that is formed by the hoods 714, . . . , and 744 when cut along the Y-Z plane, and the same applies to cross sections of the other columns of the hoods 700 when cut along the Y-Z plane.

The hood 700 has a reflective unit 750. The reflective unit 750 covers the inner surface of the cylinder formed by the hood 700. The reflective unit 750 is provided in order to further increase the reflectance of the light L from the light source 61. It is sufficient that the reflective unit 750 is a member having a higher reflectance of the light L than that of resin as a material of the hood 700 in the embodiment. For example, the reflective unit 750 may be a sheet-like reflective member that is bonded to the inner surfaces of the hood 700, may be a metal member or a compound that firmly adheres to the inner surface of the hood 700 by a method of coating, deposition, or the like, or may be a member provided on the inner side of the hood 700 by another method.

The reflective unit 750 includes a first inner surface portion 751 and a second inner surface portion 752 opposing each other in the Y direction and a third inner surface portion 753 and a fourth inner surface portion 754 opposing each other in the X direction. The extension length of the second inner surface portion 752 in the Z direction is larger than that of the first inner surface portion 751. Difference in the extension length in the Z direction between the first inner surface portion 751 and the second inner surface portion 752 is set depending on the first direction Ia as the upward direction toward the first inner surface portion 751 from the second inner surface portion 752. The third inner surface portion 753 and the fourth inner surface portion 754 are linearly symmetric with each other with respect to the Y direction. That is to say, a straight line connecting the first end side of the third inner surface portion 753 and the first end side of the fourth inner surface portion 754 is along the X direction. A straight line connecting the second end side of the third inner surface portion 753 and the second end side of the fourth inner surface portion 754 is along the X direction. A straight line connecting the first end side of the first inner surface portion 751 and the first end side of the second inner surface portion 752 is along the Y direction.

A joint between the first inner surface portion 751 and the second inner surface portion 752, a joint between the second inner surface portion 752 and the third inner surface portion 753, a joint between the third inner surface portion 753 and the fourth inner surface portion 754, and a joint between the fourth inner surface portion 754 and the first inner surface portion 751 in the embodiment have curved shapes. These joints may however be joints forming angles, and specific shapes thereof can be appropriately changed. The same applies to the shapes of the hoods 700 located on the outer circumference sides of these joints.

In the embodiment, the resin as the material of the hoods 700 is black resin. The black resin absorbs light more easily than resin of the other colors does. The light L from the light sources 61 can therefore be hampered from passing through the hoods 700 and leaking to the outside.

Each hood 700 broadens toward a front end portion T from a bottom portion B. In other words, the hood 700 has such a shape that a distance between the inner surfaces and the optical axis IL increases toward the output surface 701 side (the second end side) from the light source 61 side (the first end side). Such a shape functions as a shape for making the reflection direction of the light L from the light source 61 be along the Z direction and can be used as a draft angle when the hood 700 is formed by injection molding. In the wall surfaces forming the cylinder of the hood 700, the thickness of the front end portion T located relatively close to the second end side is smaller than the thickness of the bottom portion B located relatively close to the first end side. The possibility that sink is generated in the front end portion T formed as a larger cylindrical frame body in comparison with the bottom portion B can therefore be further reduced.

Figure 11:
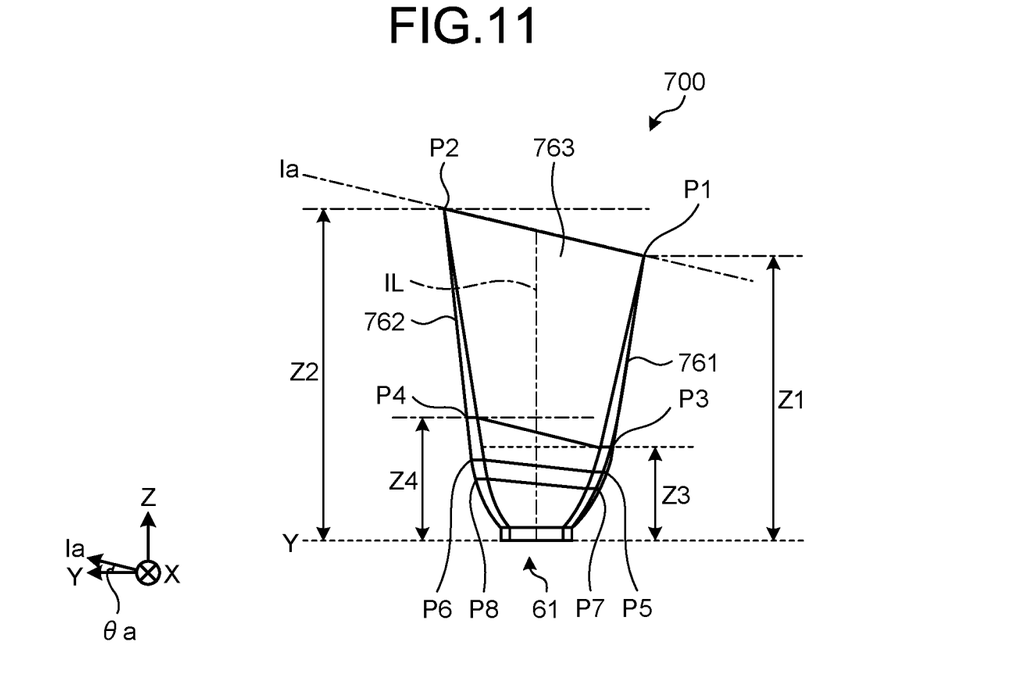
FIG. 11 is a Y-Z plan view of a hood.
Figure 12:
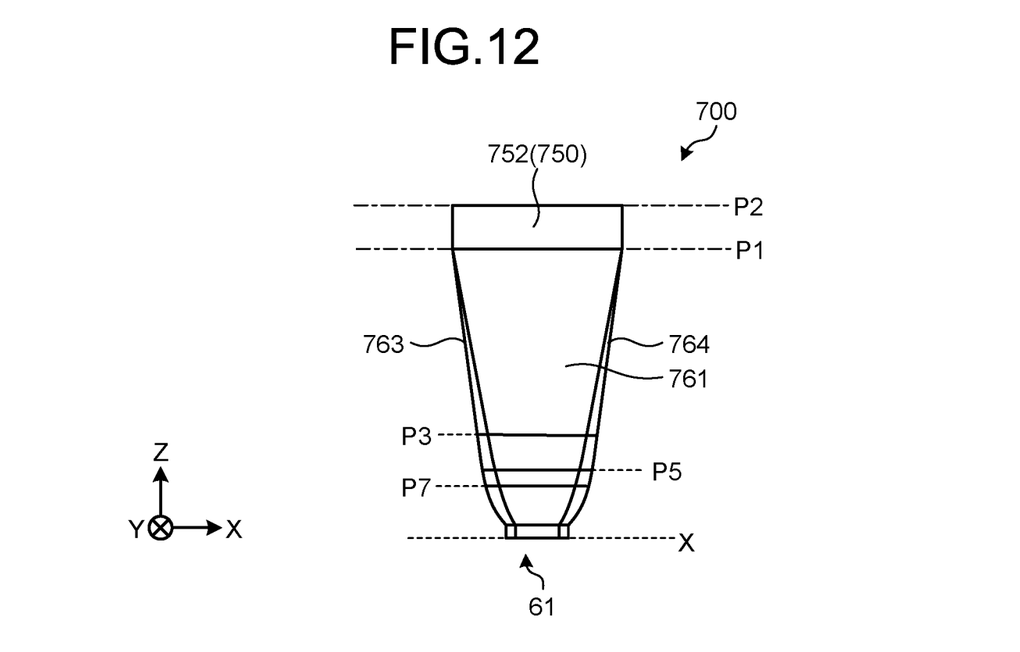
FIG. 12 is an X-Z plan view of the hood.
Figure 13:
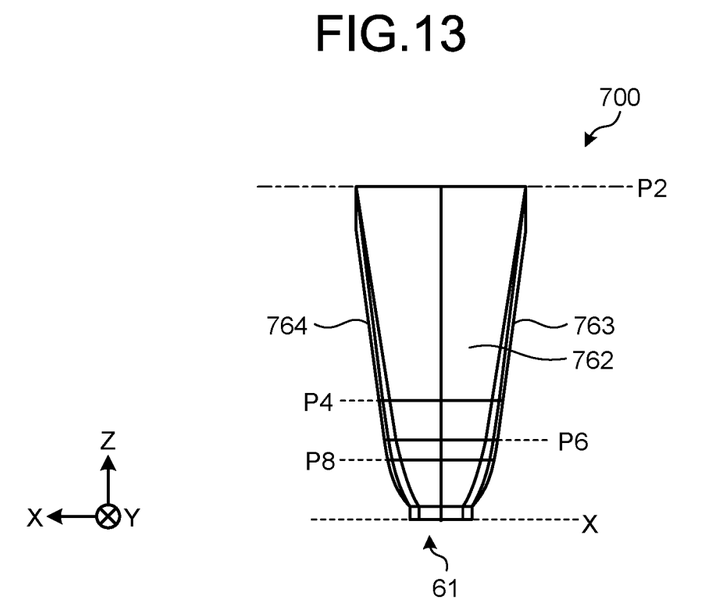
FIG. 13 is an X-Z plan view of the hood.

FIG. 11 is a Y-Z plan view of the hood 700. FIG. 12 and FIG. 13 are X-Z plan views of the hood 700. Each hood 700 includes a first wall surface portion 761 and a second wall surface portion 762 opposing each other in the Y direction and a third wall surface portion 763 and a fourth wall surface portion 764 opposing each other in the X direction. In a manner similar to the relation between the second inner surface portion 752 and the first inner surface portion 751, an extension length Z2 of the second wall surface portion 762 in the Z direction is larger than an extension length Z1 of the first wall surface portion 761 in the Z direction. Difference in the extension length in the Z direction between the first wall surface portion 761 and the second wall surface portion 762 is set depending on the first direction Ia. The third wall surface portion 763 and the fourth wall surface portion 764 are linearly symmetric with each other with respect to the Y direction in a manner similar to the relation between the third inner surface portion 753 and the fourth inner surface portion 754. That is to say, a straight line connecting the first end side of the third wall surface portion 763 and the first end side of the fourth wall surface portion 764 is along the X direction. A straight line connecting the first end side of the first wall surface portion 761 and the first end side of the second wall surface portion 762 is along the Y direction. That is to say, as described above, the first end side of the hood 700 is along the X-Y plane. A straight line connecting the second end side of the third wall surface portion 763 and the second end side of the fourth wall surface portion 764 is along the X direction. FIG. 12 is a view when viewed from the first wall surface portion 761 side. FIG. 13 is a view when viewed from the second wall surface portion 762 side.

A first intermediate portion P3 of the first wall surface portion 761 and a first intermediate portion P4 of the second wall surface portion 762 in FIG. 11 has the same distance to the optical axis IL. In contrast, an interval Z3 between the first end of the hood 700 and the first intermediate portion P3 in the Z direction is different from an interval Z4 between the first end of the hood 700 and the first intermediate portion P4 in the Z direction. In FIG. 11, Z4>Z3 is satisfied. When a line connecting the first intermediate portion P3 and the first intermediate portion P4 is drawn on the third wall surface portion 763, the line has an inclination in a direction identical to the first direction Ia with respect to the Z direction. This indicates that a curvature of the shape that broadens from the first end side of the hood 700 toward the second end side thereof is different between the first wall surface portion 761 and the second wall surface portion 762. A relation between a second intermediate portion P5 of the first wall surface portion 761 and a second intermediate portion P6 of the second wall surface portion 762 and a relation between a third intermediate portion P7 of the first wall surface portion 761 and a third intermediate portion P8 of the second wall surface portion 762 are similar to the relation between the first intermediate portion P3 and the first intermediate portion P4. In this manner, in the hood 700, the portions opposing each other at positions orthogonal to the optical axis IL are not uniform in curvature.

The reflective unit 750 provided on the inner surfaces of the hood 700 also has difference in curvature due to non-uniformity of the curvature in the inner surfaces opposing each other at positions orthogonal to the optical axis IL in a manner similar to the hood 700. The difference in the curvature is set so as to reduce the difference in reflection of the light L due to the difference in the distance from the first end to the second end between the first inner surface portion 751 and the second inner surface portion 752. That is to say, the difference in the curvature is set such that luminance distribution of the light L emitted from the output port is closer to uniformity between the first inner surface portion 751 side and the second inner surface portion 752 side with the optical axis IL interposed therebetween.

A distance to the optical axis IL does not need to be equal between the second end P1 of the first wall surface portion 761 and the second end P2 of the second wall surface portion 762. The optical axis IL may be displaced in the Y direction from the center of the output port at the second end of the hood 700 that is surrounded by the inner surfaces of the first wall surface portion 761, the second wall surface portion 762, the third wall surface portion 763, and the fourth wall surface portion 764, that is, the first inner surface portion 751, the second inner surface portion 752, the third inner surface portion 753, and the fourth inner surface portion 754. For example, the optical axis IL may be displaced to the first inner surface portion 751 side with respect to a line (intermediate line) along the Z direction from which distances to the second end P1 and the second end P2 in the Y direction are equal to each other. As for the X direction, the optical axis IL is desirably located on a line with respect to which the third inner surface portion 753 and the fourth inner surface portion 754 are linearly symmetric with each other.

Figure 14:
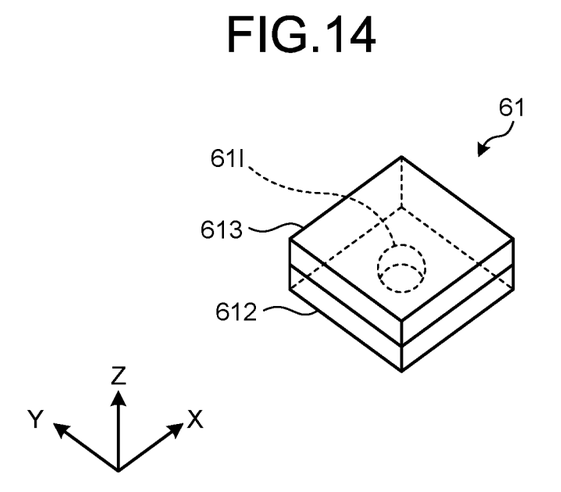
FIG. 14 is a perspective view of the light source.

FIG. 14 is a perspective view of the light source 61. Each light source 61 has the LED 611, the substrate 612, and a diffusion member 613. The LED 611 is a light emitting diode emitting white light, for example. The LED 611 is on with electric power supplied from the power supply unit 62 and emits light. The substrate 612 is a substrate on which wiring that is to be coupled to the LED 611 is mounted. The substrate 612 is installed on any of the levels of the power supply unit 62 to couple the LED 611 and the power supply unit 62. With reference to a positional relation between the first end and the second end of the hood 700, the substrate 612 is located on the first end side of the LED 611. The LED 611 emits light to the second end side. The diffusion member 613 is a hood having translucency and provided so as to cover the second end sides of the LED 611 and the substrate 612 and has the same configuration as that of the diffusion plate 9. The diffusion member 613 diffuses the light from the LED 611 in a planar form and outputs it from the second end side.

In the embodiment, X-Y planar shapes of the substrate 612 and the diffusion member 613 are rectangular shapes each having four sides including two sides opposing each other along the X direction and the other two sides opposing each other along the Y direction. The inner shape of the cylinder at the first end of the hood 700 corresponds to the outer shape of the X-Y planar shape of the light source 61. Thus, the light source 61 has a light emission surface having a rectangular shape. The hood 700 is formed to have a shape along the X-Y plane that has four sides (the first wall surface portion 761, the second wall surface portion 762, the third wall surface portion 763, and the fourth wall surface portion 764) along the four sides of the light emission surface (see FIG. 8).

The substrate 612 in the embodiment is a black substrate on at least the second end side. That is to say, the color of the substrate 612 on at least the side on which the LED 611 is provided is black. The optical axis IL from the LED 611 can therefore be hampered from passing through the substrate 612 and leaking to the first end side. The substrate 612 may be formed such that only the surface of the substrate 612 on the second end side before a wiring pattern and the like are formed is black or a larger area including the surface of the substrate 612 on the first end side is black.

Although in FIG. 14, one LED 611 is provided in one light source 61, a plurality of LEDs 611 may be provided in one light source 61.

As described above, according to the embodiment, the hoods 700 are made of black resin. The light L from the light sources 61 can therefore be hindered from passing through the hoods 700 and leaking to the outside. That is to say, reduction in the display quality due to light leakage can be inhibited.

The foods 700 have the reflective units 750 covered by the members having a higher reflectance of the light L than the black resin. Both of restraint of the light leakage with the black resin and guidance of the light L by the reflective units 750 can therefore be achieved.

The hood 700 has a shape that broadens toward the output surface 701 side such that the distance between the inner surface thereof and the optical axis IL increases toward the output surface 701 side from the light sources 61 side. The light L can therefore be guided to the display unit 2 side more preferably.

The hoods 700 have thicknesses of the front end portions T smaller than the thicknesses of the bottom portions B. This can further reduce the probability that a sink mark is generated in the front end portions T formed as the larger cylindrical frame bodies in comparison with the bottom portions B.

The plate surface 201 of the display unit 2 is inclined with respect to the X-Y plane. Generation of a ghost due to multiplex projection caused by superimposition of the light from the light source and the reflected light can therefore be hindered. The output surface 701 of the light guiding unit 7 is inclined with respect to the X-Y plane. The inclination direction of the plate surface 201 with respect to the optical axis IL along the Z direction is the same as the inclination direction of the output surface 701. This can provide the image VI that is viewed as a rectangular image in which imbalance of the brightness is not generated entirely. Accordingly, the embodiment can achieve both of restraint of the occurrence of a ghost and improvement in display quality.

Furthermore, each hood 700 has such a shape in which the inner surfaces opposing each other at the positions orthogonal to the optical axis IL are not uniform in curvature. The difference in the reflection of the light L due to the difference in the distance from the first end to the second end between the first inner surface portion 751 and the second inner surface portion 752 can therefore be reduced by the difference in curvature.

Furthermore, the optical axis IL is displaced from the intermediate line in a predetermined direction. The predetermined direction is a direction toward the second end P1 side that is one of the second end P1 side and the second end P2 side disposed with the intermediate line interposed therebetween and on which the distance between the edge of the output port and the light source 61 is relatively small due to the inclination in the first direction Ia. The difference in the reflection of the light L due to the difference in the distance from the first end to the second end between the first inner surface portion 751 and the second inner surface portion 752 can therefore be further reduced.

Furthermore, each light source 61 has the light emission surface having the rectangular shape. The hood 700 is formed to have the shape along the X-Y plane that has the four sides along the four sides of the light emission surface. The light source unit 6 that is preferable for illumination of the display unit 2 having the rectangular display region 21 can thereby be provided.

Furthermore, the multiple light sources 61 and the multiple hoods 700 are provided. The hoods 700 are individually provided for the respective light sources 61. The light sources 61 aligned along the first direction Ia are arranged in the stepwise manner. With this arrangement, the output surfaces of the light L from the light sources 61 can be made along the X-Y plane to make the optical axes IL along the Z direction, and the light sources 61 can be arranged along the first direction Ia. Arrangement of the light sources 61 for the local dimming in the direction along the first direction Ia can be achieved.

Furthermore, the light sources 61 are aligned along the X direction. Arrangement of the light sources 61 for the local dimming in the X direction can therefore be achieved.

Furthermore, the diffusion plate 9 that is arranged between the light guiding unit 7 and the display unit 2 and diffuses light is included. The display region 21 can thereby be uniformly illuminated.

Furthermore, the diffusion plate 9 is inclined in an inclination direction identical to that of the display unit 2 with respect to the X-Y plane. The difference in angle with respect to the X-Y plane between the second direction Ib and the third direction Ic is within ±2%. Generation of the imbalance of the brightness in the image VI can thereby be further hindered.

Furthermore, the hoods 700 constituting the light guiding unit 7 have the same shape. The hoods 700 can be manufactured using the same mold or the like, and the hoods 700 can be combined to form the light guiding unit 7. Accordingly, the light guiding unit 7 can be manufactured more easily.

The above-mentioned embodiment is merely an example and can be appropriately modified in a range without deviating from the technical characteristics of the present disclosure. For example, although the display unit 2 in the embodiment is a display panel enabling color display, the display unit 2 may be a monochrome display panel. In the embodiment, the light sources 61 and the hoods 700 are arranged in a matrix with the row-column configuration. Alternatively, the light sources 61 and the hoods 700 may be arranged in one of the X direction and the first direction Ia or one light source 61 and one hood 700 may be provided.

Modification

Figure 15:
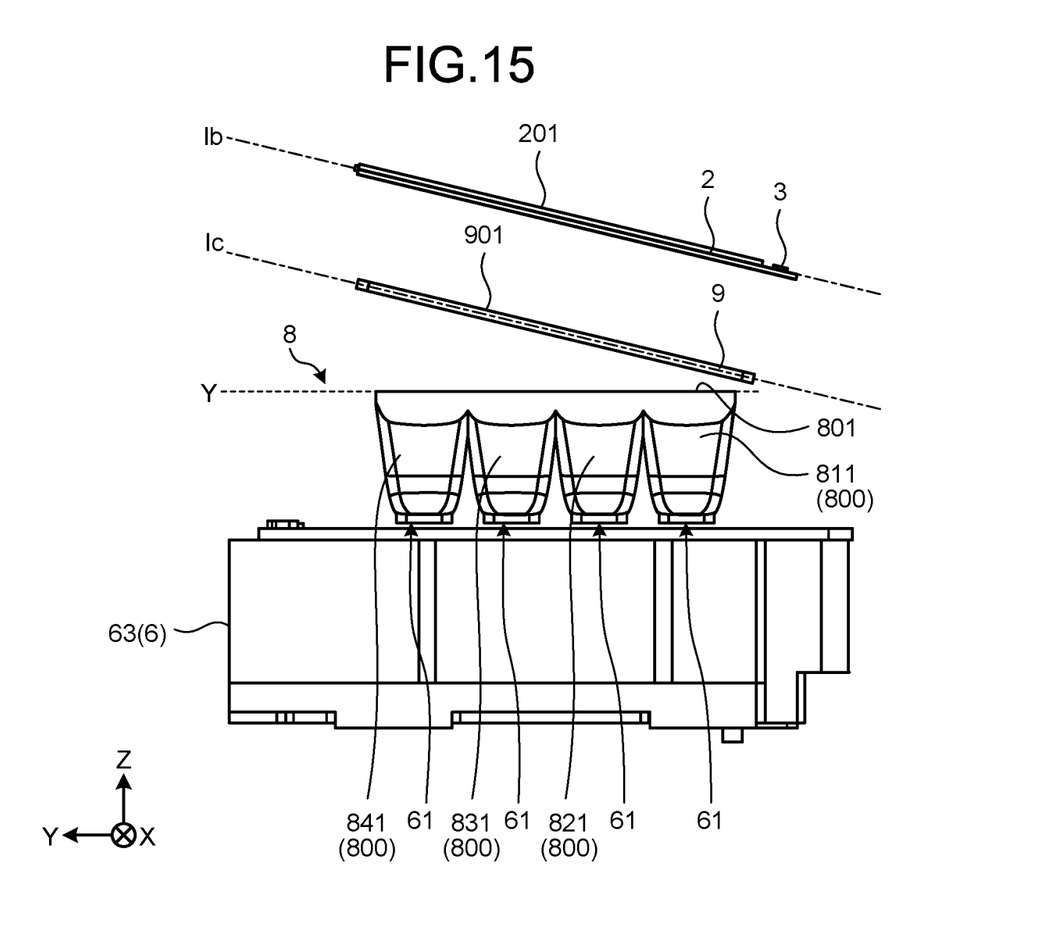
FIG. 15 is a diagram illustrating aspects and an arrangement of the display unit, the light source unit, a light guiding unit, and the diffusion plate according to a modification.

FIG. 15 is a diagram illustrating aspects and an arrangement of the display unit 2, the light source unit 6, a light guiding unit 8, and the diffusion plate 9 according to a modification. In the above-mentioned embodiment, the light guiding unit 7 having the output surface 701 inclined with respect to the X-Y plane is used. Alternatively, the light guiding unit 8 having an output surface 801 along the X-Y plane may be used instead of the light guiding unit 7.

A display device in the modification includes the light guiding unit 8 functioning as the reflector unit RU. The light guiding unit 8 has a plurality of hoods 800. Each of the hoods 800 functions as the reflector R. That is to say, the hood 800 is provided as a cylindrical member extending toward the display unit 2 from the light source 61 and covering the periphery of the optical axis IL of the light L from the light source 61. The hood 800 reflects the light L from the light source 61 by the inner surface thereof and guides it to the display unit side. Although FIG. 15 illustrates hoods 811, 821, 831, and 841 as four hoods 800 aligned in the Y direction, the number of hoods in the X direction and the number of them in the Y direction can be appropriately changed in a manner similar to the embodiment.

First end sides of the hoods 800, that is, the sides on which the light sources 61 are provided are along the X-Y plane in a manner similar to the hoods 700. That is to say, the first end side and the second end side (output surface 801) of the light guiding unit 8 are parallel to each other. The light guiding unit 8 does not have the steps provided on the first end side of the light guiding unit 7 in the embodiment. That is to say, the first end sides of the hoods 800 included in the light guiding unit 8 are aligned along the X-Y plane. A power supply unit 63 in the modification does not therefore have such steps provided in the power supply unit 62 in the embodiment. The surface of the power supply unit 63 on which the light sources 61 are placed is along the X-Y plane.

Each of the hoods 800 is a cylindrical member having fourth sides corresponding to the rectangular light source 61 having four sides in a manner similar to the hood 700. The hood 800 however has symmetrical wall surfaces and inner surfaces corresponding to opposing two sides of the four sides unlike the hood 700. That is to say, the two sides opposing each other at positions orthogonal to the optical axis IL are uniform in curvature. The optical axis IL in the modification is located at the center of an output port of the hood 800 on the second end side.

The modification and the embodiment have similar configurations except for the matters specially mentioned above. That is to say, the modification and the embodiment are the same in that the hoods 800 are made of black resin, the hood 800 each have a shape that broadens toward the second end side from the first end side, the hood 800 has the reflective unit 750 covered by the member having a higher reflectance of light than the resin, the shape of the reflective unit 750 in the modification corresponds to the wall surface of the hood 800, the thickness of the front end portion T is smaller than that of the bottom portion B, and so on.

Other action effects provided by the aspect described in the embodiment that are obvious from description of the present specification or at which those skilled in the art can appropriately arrive should be interpreted to be provided by the present disclosure.

What is claimed is:

1. A display device comprising:
 a light source configured to emit light;
 a display panel capable of receiving the light from a first surface side and transmitting the light to a second surface side; and
 a cylindrical hood extending to the first surface side of the display panel from the light source and covering a periphery of an optical axis of the light, wherein
 the hood is made of black resin.

2. The display device according to claim 1, wherein the hood has an inner surface covered by a member having a higher reflectance of light than the resin.

3. The display device according to claim 1, wherein the hood has such a shape that a distance between an inner surface and the optical axis increases toward the first surface side from the light source side.

4. The display device according to claim 1, wherein the hood has a smaller thickness on the first surface side than a thickness on the light source side.

5. The display device according to claim 1, wherein the light source is provided on the first surface side of a substrate, and at least the first surface side of the substrate is black.

6. The display device according to claim 1, wherein
 the display panel is inclined with respect to an orthogonal surface orthogonal to the optical axis,
 an output surface of the hood that is framed by an output port of the light is inclined with respect to the orthogonal surface, and
 an inclination direction of the display panel with respect to the optical axis is identical to an inclination direction of the output surface with respect to the optical axis.

* * * * *